United States Patent [19]

Novick et al.

[11] Patent Number: 5,940,615
[45] Date of Patent: Aug. 17, 1999

[54] PROGRAMMING AID FOR ENABLING A COMPUTER PROGRAM IN SOURCE CODE FORM TO BE VIEWED USING A GENERAL PURPOSE DOCUMENT BROWSER

[75] Inventors: Yoram Novick; Ron Yair Pinter, both of Haifa; Michael Rodeh, Oshrat; Alan Jay Wecker, Haifa, all of Israel

[73] Assignee: International Business Machines Corporation, Armonk, N.Y.

[21] Appl. No.: 08/799,815

[22] Filed: Feb. 13, 1997

[30] Foreign Application Priority Data

May 8, 1996 [GB] United Kingdom .................... 9609561

[51] Int. Cl.⁶ ..................................................... G06F 9/445
[52] U.S. Cl. .......................... 395/701; 395/701; 395/702; 395/706; 395/712
[58] Field of Search .................................. 395/701, 705, 395/200.57, 704, 156, 200.54, 762, 710, 718, 712; 364/419, 419.08, 140; 345/326, 357; 604/218

[56] References Cited

U.S. PATENT DOCUMENTS

| | | | |
|---|---|---|---|
| 4,965,765 | 10/1990 | Brown | 364/900 |
| 5,317,511 | 5/1994 | Jacobson | 364/419 |
| 5,339,433 | 8/1994 | Frid-Nielsen | 395/700 |
| 5,398,312 | 3/1995 | Hoffman | 604/218 |
| 5,491,796 | 2/1996 | Wanderer et al. | 395/200 |
| 5,727,147 | 3/1998 | Van Hoff | 395/200.3 |
| 5,745,350 | 4/1998 | Leone et al. | 707/513 |
| 5,764,989 | 6/1998 | Gustafsson et al. | 395/704 |

OTHER PUBLICATIONS

Bertot, Yves, "Occurance in Debugger Specification", Proc of the ACM SIGPLAN'91, Prog. Lang. Design & Implemention., pp. 327–337.

Crawford, Tammi, SID: A Graphical Browser, ACM 1991, pp. 62–65.

VanHaren et al., "DASH: A resources browser and help system", ACM SIGUCCS XIX 1991, pp. 405–406.

*Primary Examiner*—Tariq R. Hafiz
*Assistant Examiner*—Anil Khatri
*Attorney, Agent, or Firm*—Scully, Scott, Murphy & Presser; Jay P. Sbrollini, Esq.

[57] ABSTRACT

Disclosed is a programming aid for enabling a computer program in source code form to be viewed using a general purpose document browser, which browser is responsive to a defined set of control tags determining the appearance of a document thereon, the programming aid comprising: a parser for generating a symbol table from an input file in which the program is stored; means to derive control tag locations from the symbol table; and an output file generator for inserting control tags into the program at the derived locations to generate an output file which can be viewed using the general purpose document browser. In this way, the full power of available general purpose document browsers may be used in software development and maintenance to view programs in a convenient way. A tool is provided that automatically marks up a program with control tags so that users are free to use the document browser of their choice as a powerful program browser.

19 Claims, 6 Drawing Sheets

PROGRAMMING AID FOR ENABLING A COMPUTER PROGRAM IN SOURCE CODE FORM TO BE VIEWED USING A GENERAL PURPOSE DOCUMENT BROWSER

FIELD OF THE INVENTION

This invention relates to computers and, more particularly, to a programming aid for enabling a computer program in source code form to be viewed using a general purpose document browser.

BACKGROUND OF THE INVENTION

Most programmers are faced at some time or another with the prospect of understanding the structure of existing software, whether it be for maintenance or development. More often than not, program documentation is insufficient and a programmer is forced to examine actual source code for this task. For large and complex programs this exercise is time consuming and error prone. Consequently, tools to aid in the efficient and effective inspection of programs are very valuable. One type of such tools is program browsers.

Program browsers are sometimes provided with modern compiler products and require a language dependent program processor, whose functionality includes fully-fledged parsing of the source code as well as some semantic analysis. Also desirable is the provision of sophisticated and efficient display and search capabilities, together with a convenient user interface.

However, at the present time the very rapid changes and developments in the field of browser technology has meant that providing program development tools which keep pace with the latest developments in browser technology can be a real problem. In addition, changes in programming languages give rise to the need for new browsers.

Also available are document browsers which take as input a document which includes certain control tags, interpret the tags and present the document to the user on a computer screen. Examples of such browsers are the IBM BookManager software product from IBM Corp, which uses the BookMaster tag language and the various browsers which are available to view documents which employ HTML tags. The HTML tag language is used by documents which make up the World Wide Web.

SUMMARY OF THE INVENTION

It is therefore an object of the present invention to provide an improved program browser.

In brief, this and other objects are achieved by providing a programming aid for enabling a computer program in source code form to be viewed using a general purpose document browser, which browser is responsive to a defined set of control tags determining the appearance of a document thereon, the programming aid comprising: a parser for generating a symbol table from an input file in which the program is stored; means to derive control tag locations from the symbol table; and an output file generator for inserting control tags into the program at the derived control tag locations to generate an output file which can be viewed using the general purpose document browser.

In this way, the full power of available general purpose document browsers may be used in software development and maintenance to view programs in a convenient way. A tool is provided that automatically marks up a program with control tags so that users are free to use the document browser of their choice as a powerful program browser. This gives the user the flexibility and convenience of using a browser with a user interface or other features that they may prefer, or with which they are familiar, and means that they are not necessarily forced to learn a new user interface each time they use a new programming system.

Furthermore, the invention reduces the burden on compiler and programming language developers since it potentially removes the need to reimplement sophisticated display and search capabilities and the user interface of a dedicated program browser each time a new programming language is introduced.

If the control tags are the HTML control tags, or tags similar in form and purpose, the invention provides a form of distributed program browser whereby programs can be conveniently viewed by a number of different users at remote locations over the World Wide Web.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENT(S) OF THE INVENTION

Figure 1:
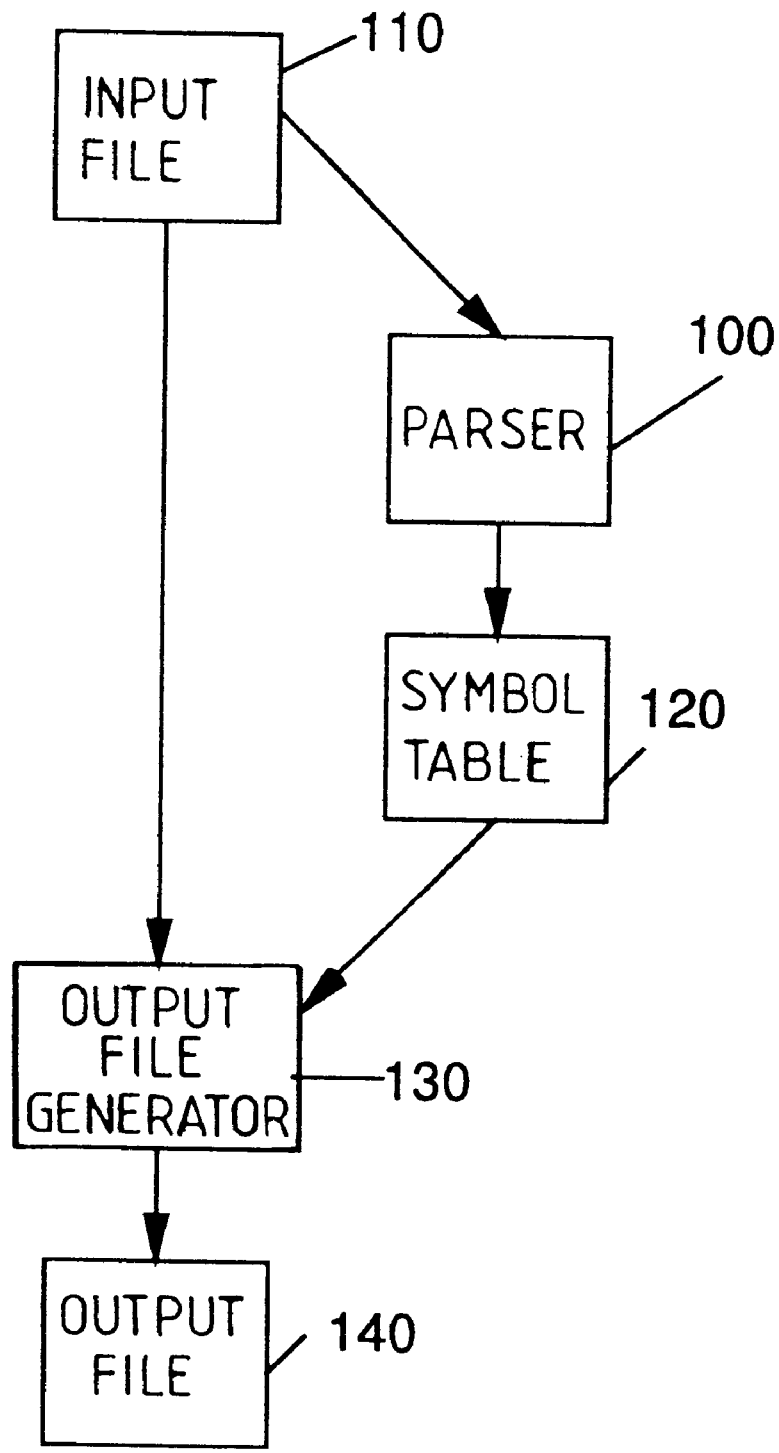
FIG. 1 is a schematic diagram showing a programming aid.

FIG. 1 is a schematic diagram illustrating the main functional components of a programming aid in one embodiment of the invention. The apparatus comprises a parser 100 which is arranged to receive an input file 110 including a computer program in source code form. The parser generates a symbol table 120. An output file generator 130 uses the information in the symbol table to parse the input file for a second time and to generate an output file 140 which includes control tags inserted at certain locations to enable the program code to be viewed using a general purpose document browser which is responsive to the control tags, the tags determining the appearance of the program on the browser.

Figure 2A:
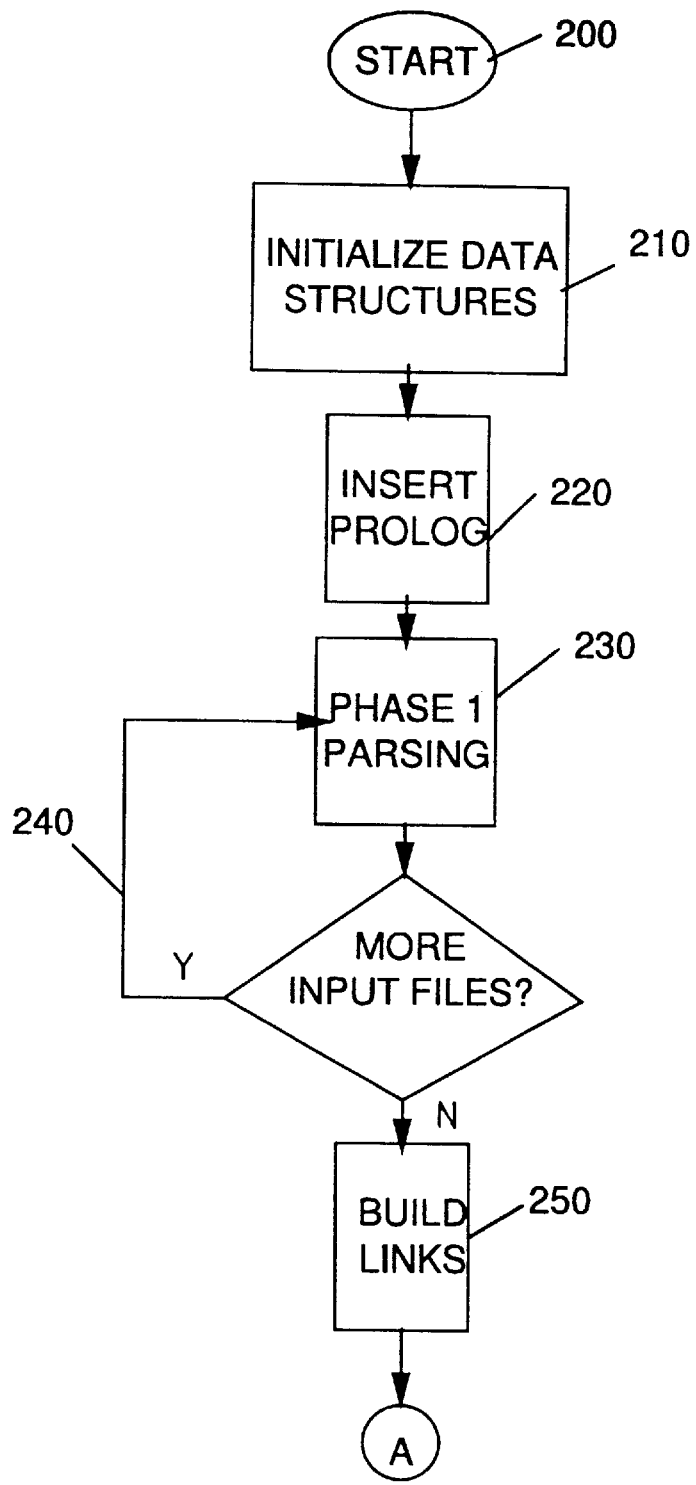
FIGS. 2A and 2B are flow diagrams showing the general operation of the programming aid.
Figure 2B:
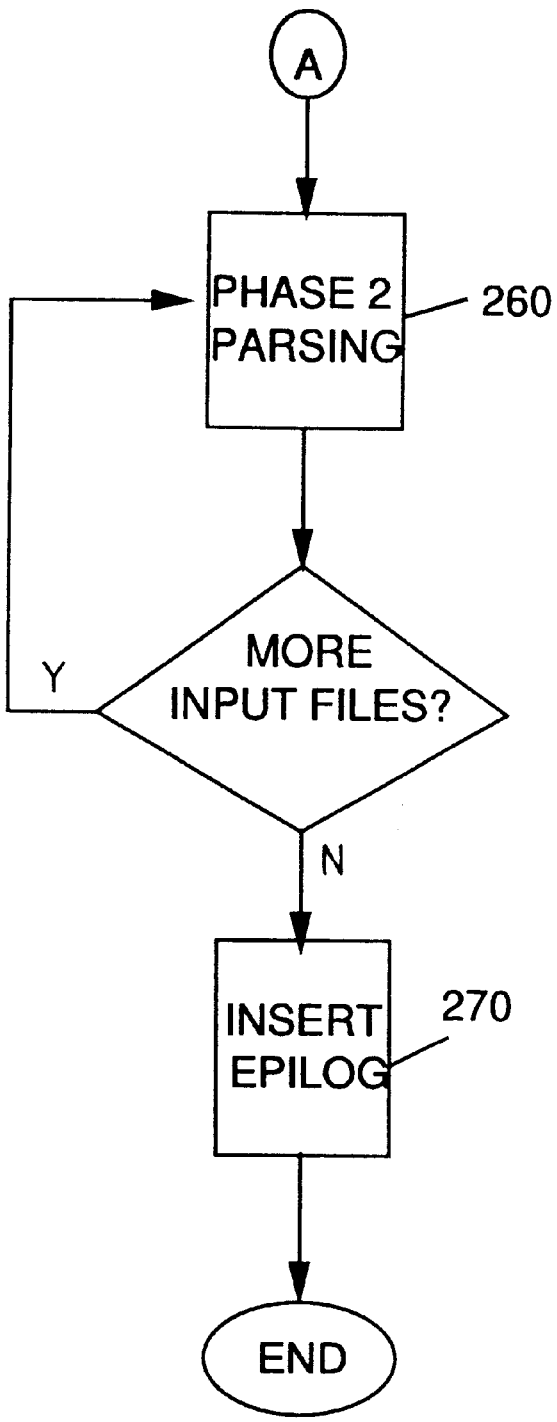

FIGS. 2A and 2B together form a flow diagram illustrating the overall operation of the system. The process starts at step 200. The various data structures used by the program are initialised in step 210 and a prolog inserted in an output file in step 220. Parser 100 then performs a first parsing phase in step 230. This phase is described in more detail below. This parsing step is repeated for any further input files following loop 240.

The aim of the parsing step is to generate symbol table 120. Symbol table 120 is in essence a conventional symbol table as would be generated by the parser of a conventional compiler although for this application not all the information that a conventional compiler symbol table contains may be needed. The symbol table contains all the tokens found while scanning the input files. For every token, a set of attributes associated with the token is kept.

In addition, the inter-relations among different tokens are kept in the table. An example of a Token is a keyword (e.g., IF, ELSE, FOR), a variable name, a routine name, etc. An example of interrelation is a CALL relation (routine X is calling routine Y), a CONSTRUCT relation (e.g., ELSE X is part of an IF statement that begun with IF Y), etc.

It will be understood by those skilled in the art that there are many ways to implement the table and in most implementations the table would be a combination of several primitive data structures, such as arrays, trees, linked lists, or the like. The detailed structure of a symbol table will be well understood by those skilled in the art and need not be discussed in any further detail herein.

Figure 3:
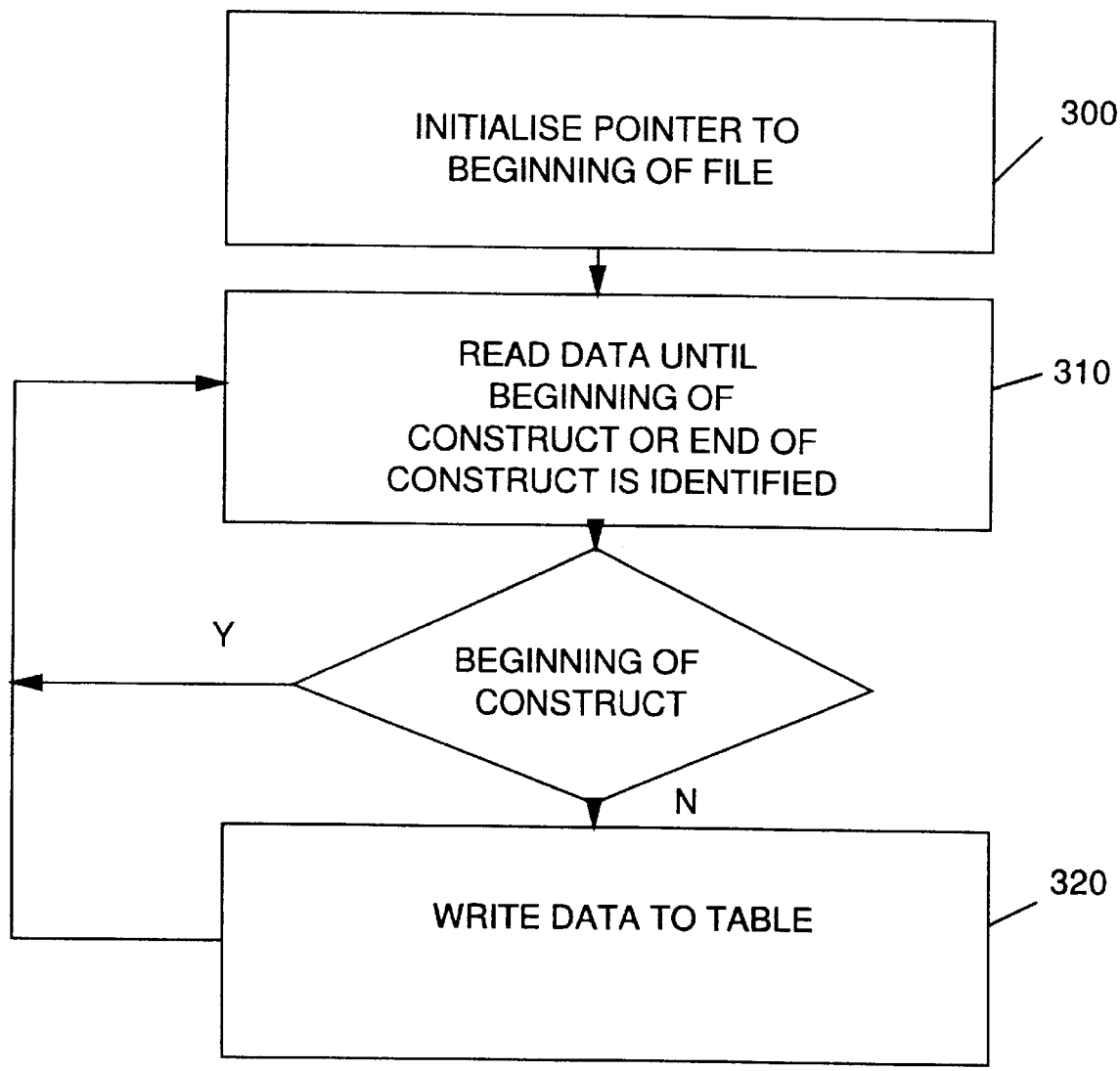
FIG. 3 is a flow diagram showing a phase 1 parsing process.

FIG. 3 is a flow diagram illustrating the phase 1 parsing step. A pointer is initialised at the beginning of the input file in step 300. Data is read in step 310 until a beginning-of-construct or end-of-construct delimiter is identified. The beginning-of-construct delimiter can simply be the ASCII code representing a space followed an ASCII character representing a letter of the alphabet, the end-of-construct delimiter can be for instance the ASCII code representing a space. This will, of course, depend upon the particular programming language concerned. Once a beginning-of-construct and end-of-construct pair is identified, the data between them is recognised as a token and written to the symbol table 120 in step 320.

It will be understood that parser 100 is program language specific and would need an implementation for each programming language supported by the tool. The other components of the tool could be implemented in a manner which is common to different programming languages. The tool could be provided with more than one parser 100 so that it can support more than one programming language.

After the phase 1 parsing step 230, a build links process 250 is performed. This process adds to symbol table 120 all the information regarding the interrelations among different Tokens.

Figure 4:
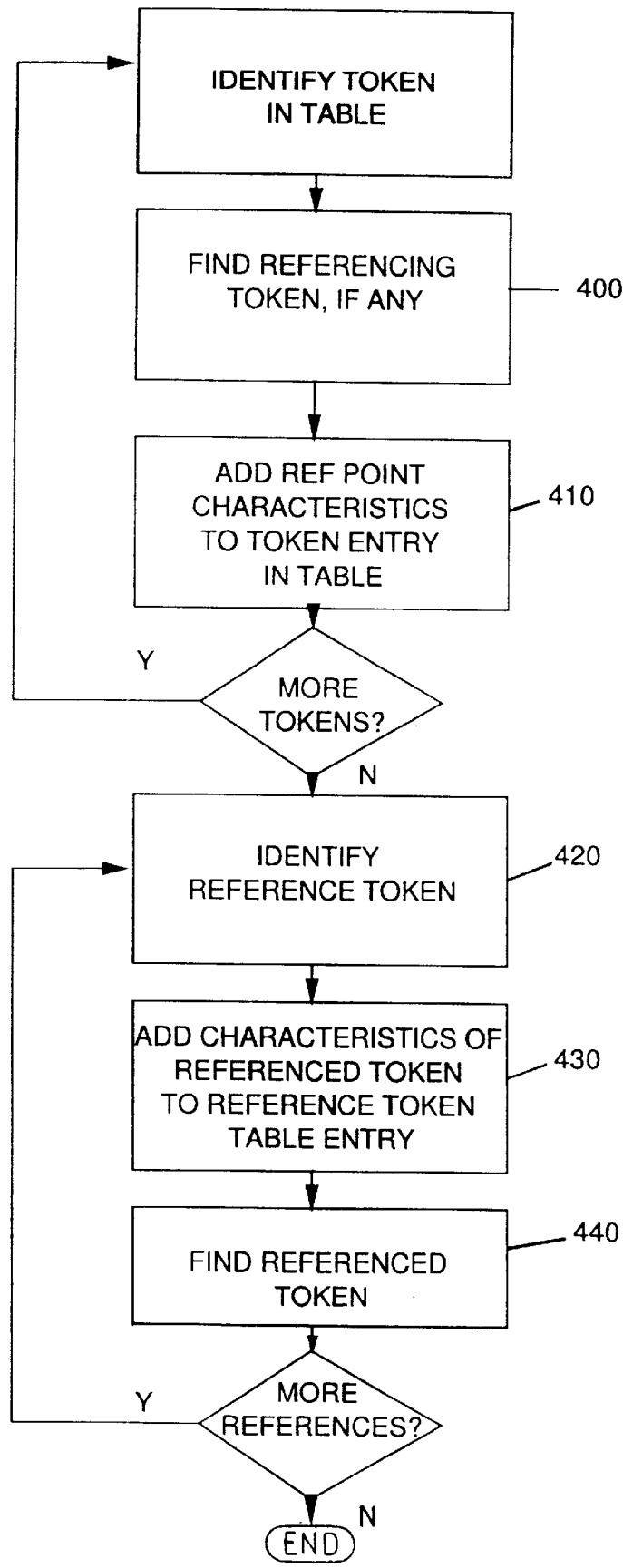
FIG. 4 is a flow diagram showing a build links process.

FIG. 4 is a flow diagram illustrating the build links process.

For every token in the table, the BUILD LINKS Process finds all the tokens that reference it in step 400 and adds the attributes of the referencing tokens to the entry of the referenced token in the table in step 410.

The BUILD LINKS Process then identifies all the referencing tokens in the symbol table in step 420. For every referencing token, it identifies the associated referenced token in step 430 and adds the attributes of the referenced token to the entry of the referencing token in the table in step 440.

Examples of a referencing token are a CALL statement, a MACRO usage or a variable usage. Corresponding examples of a referenced token are a routine invoked by a CALL statement, a MACRO definition and a variable definition.

Using the attributes that were recorded in the table during the BUILD LINKS Process, a 'Phase 2 Parsing' Process shown as step 260 in FIG. 2B generates the appropriate Markup Language tags to create the necessary hypertext links between referencing objects and referenced objects.

Figure 5:
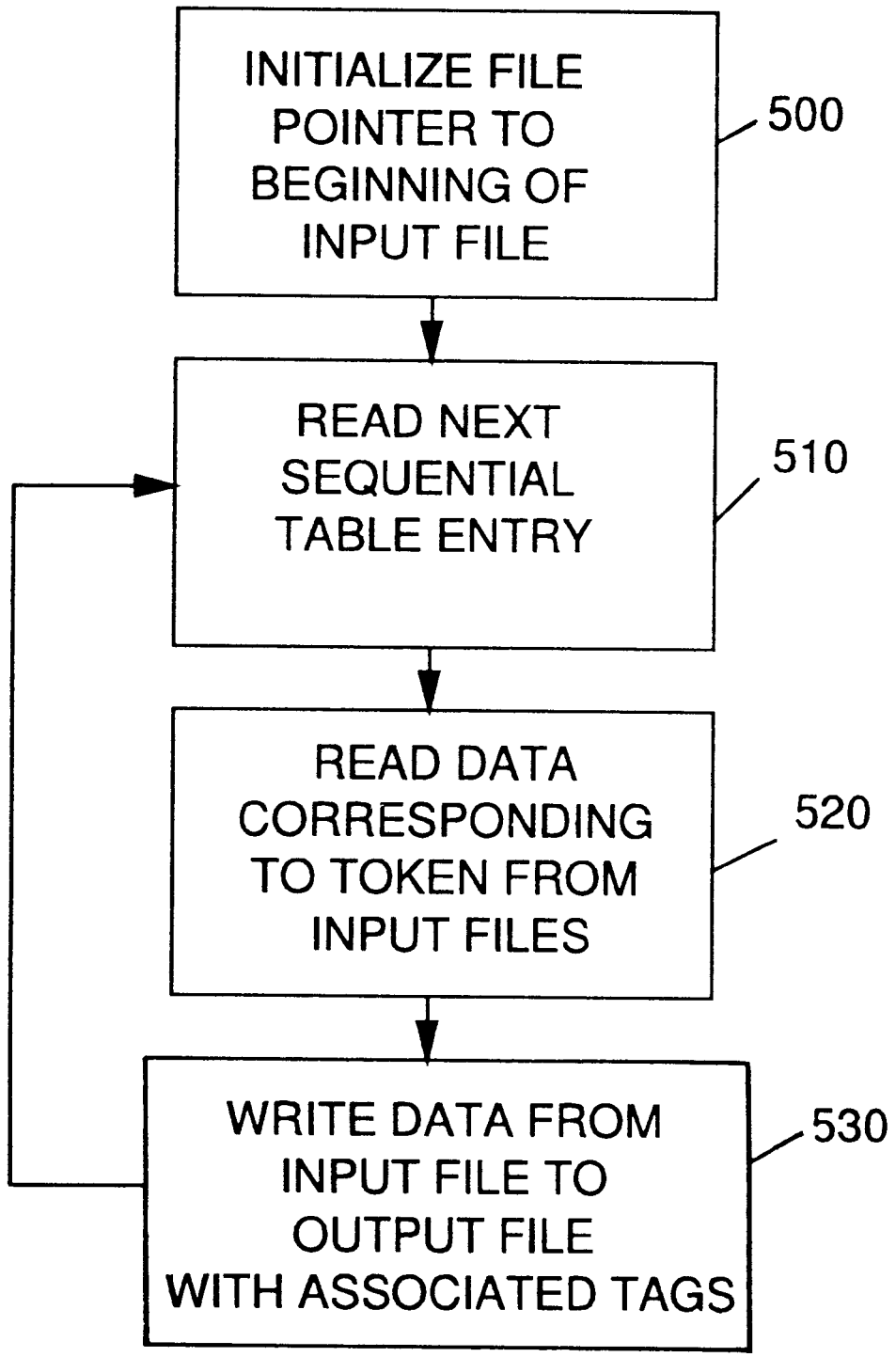
FIG. 5 is a flow diagram showing a phase 2 parsing process.

FIG. 5 is a flow diagram illustrating the phase 2 parsing process. The file pointer is initialised to the beginning of the input file in step 500. The tokens from the table are read in the sequence in which they feature in the input files in step 510. Data corresponding to the token is read from the input files in step 520. Then data is written to the output file in step 530 which includes the data from the input file and suitable control tags which are appropriate to the token type and, if applicable, any associated references.

Once all input files have been processed in this manner, a suitable epilog is inserted at the end of the output file, see step 270 in FIG. 2.

The output file is then in a suitable format to be viewed using a general document browser which supports the particular tag language for the inserted tags.

It will be understood that output file generator 130 is specific to a particular tag language and would need an implementation for each tag language supported by the tool. The other components of the tool could be implemented in a manner which is common to different tag languages. The tool could be provided with more than one output file generator 130 so that it can support more than one tag language.

There are many different ways in which the features of various tag languages may be used to enhance to appearance of program code. The following are a few examples of the type of enhancements that can be used.

Highlighted tags can be used to apply special fonts and colours to different language constructs, such as keywords, constants and identifiers. Each function name can be marked with a heading tag. This enables a table of contents to be generated which includes a list of function names. Using hierarchical headings for nested functions can assist in visualising nested functions.

Vertical lines can be used to emphasise block structures of programs. Hypertext links can be added which link the beginning and end of a program block and/or between a declaration of a program variable and its usage. In this way using certain document browsers, a mouse click on a variable can be used to immediately display its declaration.

Each function call or goto statement can be linked to its target and/or indexed to enable an effective search of the calling locations of functions or all labels.

Deletion tags can be used to mark code which has been commented out. Normal text control tags, e.g. paragraph markers or the like, can be used in comment statements to obtain text of the normal quality found in publications.

Comments in the program can be linked to other related documents stored in softcopy form, such as user documentation or functional specification documents, as well as other information sources on the World Wide Web.

A summary of the above types of markup element and the tags used in the IBM BookMaster language is shown in Table I.

A description of the IBM BookMaster tag language can be found in the IBM Publication number GC34-5006-6 'BookMaster General Information' (1993) and other published IBM manuals associated with the product.

TABLE I

| Program Element | Tag Type | Example |
| --- | --- | --- |
| Language construct | Highlighted phrase tag | :hp1–:hp9 |
| Function name | Hierarchical headings tag | :h2–:h20 |
| Blocks structure | Vertical lines connecting the beginning of a block with its end or hypertext link | &bxul.,&bxv,&bxll.; :spot.,:spotref. |
| Declarations of program variables constants or macros | Indexing tags and associative links | :i1. |

TABLE I-continued

| Program Element | Tag Type | Example |
|---|---|---|
| Function call or Goto statement | Indexing tags for searches only | :i1 include = search |
| Function call or goto statement | Hypertext links | :spot., :spotref |
| Commented out code | Marked Deletion | :md |
| Other related Documentation. | Hypertext links | :docdesc.,:autolink. |

Once the marked up program file is generated, it can be used in all those operating systems which are supported by the softcopy system. For example, the IBM BookManager system can be used in the VM, DOS, OS/2, AIX and MVS operating system environments. The environment which is used by the programming tool to generate the marked up file does not limit the environment in which it can be viewed. It is possible to parse the input code in one operating environment to be viewed in another. Use of the HTML tags language would enable a program to be view using the World-Wide-Web thus providing a form of distributed browser. Further information about the World Wide Web can be found in "Spinning the Web" by Andrew Ford (International Thomson Publishing, London 1995) and "The World Wide Web Unleashed" by John December and Neil Randall (SAMS Publishing, Indianapolis 1994).

There has been described a new approach to developing program browser using front-end compiler technology and existing general purpose document browsers, which already have efficient browsing features and sophisticated user interfaces. This approach eases significantly the effort required to implement a program browser for new programming languages and new programming systems and enables all the power of existing document browsing systems to be employed to enable programs to be examined. It will be noted that the source code to be processed using the programming tool does not need to be modified in any way by the process.

As will be clear from the above description, the present implementation takes the form of a computer program and can be distributed in the form of an article of manufacture comprising a computer usable medium in which suitable program code is embodied for causing a computer to perform the function of the programming aid described above.

The programming aid could take the form of a 'stand-alone' system or could be implemented as part of a compiler or other programming tool which is provided with the facility to export marked up files for viewing using a general purpose browser.

The invention is applicable to the industrial field of computers and computer program development systems.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A programming aid for enabling a computer program in source code form to be viewed using a general purpose document browser, which browser is responsive to a defined set of control tags determining the appearance of a document thereon, the programming aid comprising:

a parser for generating a symbol table from an input file in which the program is stored;

means to derive control tag locations from the symbol table;

an output file generator for inserting control tags into the program at the derived control tag locations to generate an output file which can be viewed using the general purpose document browser.

2. A programming aid as claimed in claim 1 comprising means to generate, and to record in the symbol table, links between constructs in the program and wherein at least some of the control tags are arranged to link locations in the output file corresponding to such linked constructs.

3. A programming aid as claimed in claim 1 wherein at least some of the control tags form hypertext links.

4. A programming aid as claimed in claim 1 wherein the control tags are BookManager control tags or HTML control tags.

5. A programming aid as claimed in claim 1 in the form of a compiler having the facility to export files which include the control tags.

6. A programming aid as claimed in claim 1 comprising a plurality of parsers for supporting a plurality of programming languages.

7. A programming aid as claimed in claim 1 comprising a plurality of output file generators for supporting a plurality of control tag languages.

8. A computer program product comprising a computer usable medium in which program code is embodied for causing a computer to perform the function of a programming aid for enabling a computer program in source code form to be viewed using a general purpose document browser, which browser is responsive to a defined set of control tags determining the appearance of a document thereon, the programming aid comprising:

a parser for generating a symbol table from an input file in which the program is stored;

means to derive control tag locations from the symbol table;

an output file generator for inserting control tags into the program at the derived locations to generate an output file which can be viewed using the general purpose document browser.

9. A computer program product as claimed in claim 8 comprising means to generate, and to record in the symbol table, links between constructs in the program and wherein at least some of the control tags are arranged to link locations in the output file corresponding to such linked constructs.

10. A computer program product as claimed in claim 8 wherein at least some of the control tags form hypertext links.

11. A computer program product as claimed in claim 8 wherein the control tags are BookManager control tags or HTML control tags.

12. A computer program product as claimed in claim 8 in the form of a compiler having the facility to export files which include the control tags.

13. A computer program product as claimed in claim 8 comprising a plurality of parsers for supporting a plurality of programming languages.

14. A computer program product as claimed in claim 8 comprising a plurality of output file generators for supporting a plurality of control tag languages.

15. A method for enabling a computer program in source code form to be viewed using a general purpose document browser, which browser is responsive to a defined set of control tags determining the appearance of a document thereon, the method comprising the steps of:

generating a symbol table from an input file in which the program is stored;

deriving control tag locations from the symbol table;

inserting control tags into the program at the derived locations to generate an output file which can be viewed using the general purpose document browser.

16. A method as claimed in claim 15 comprising generating, and recording in the symbol table, links between constructs in the program so that at least some of the control tags are arranged to link locations in the output file corresponding to such linked constructs.

17. A method as claimed in claim 15 wherein at least some of the control tags form hypertext links.

18. A method as claimed in claim 15 wherein the control tags are BookManager control tags or HTML control tags.

19. A method as claimed in claim 15 implemented in a compiler having the facility to export files which include the control tags.

* * * * *